(12) United States Patent  
Ormiston (10) Patent No.: US 10,240,973 B2  
(45) Date of Patent: Mar. 26, 2019

(54) TWO-CHANNEL COMMUNICATION SYSTEMS

(71) Applicant: Lasermet Limited, Bournemouth (GB)

(72) Inventor: Graham Ormiston, Grimsby (GB)

(73) Assignee: Lasermet Limited, Bournemouth (GB)

( * ) Notice: Subject to any disclaimer, the term of this patent is extended or adjusted under 35 U.S.C. 154(b) by 64 days.

(21) Appl. No.: 15/455,763

(22) Filed: Mar. 10, 2017

(65) Prior Publication Data

US 2017/0261367 A1 Sep. 14, 2017

(30) Foreign Application Priority Data

Mar. 10, 2016 (GB) .................................. 1604136.0

(51) Int. Cl.
*G01J 1/02* (2006.01)
*G08C 17/00* (2006.01)
*H04W 4/12* (2009.01)

(52) U.S. Cl.
CPC ............ *G01J 1/0228* (2013.01); *G08C 17/00* (2013.01); *H04W 4/12* (2013.01)

(58) Field of Classification Search
CPC .................................. G01J 1/0228; H04W 4/12
See application file for complete search history.

(56) References Cited

U.S. PATENT DOCUMENTS 5,892,758 A * 4/1999 Argyroudis ............ G08C 17/02
340/870.02
2011/0296215 A1* 12/2011 Mobin .................. G06F 1/3203
713/323

FOREIGN PATENT DOCUMENTS

EP 2 592 326 A1 5/2013

* cited by examiner

*Primary Examiner* — Georgia Y Epps
*Assistant Examiner* — Don J Williams
(74) *Attorney, Agent, or Firm* — Howard & Howard Attorneys PLLC (57) ABSTRACT

A safety control system includes: a first control unit arranged to control a controlled system, a second control unit arranged to detect a fault with the controlled system and arranged to transmit messages wirelessly to the first control unit, wherein the second control unit includes: a first controller and a second controller, each of the first and second controllers being arranged to detect a condition of the controlled system and output messages indicative of whether or not the condition has been detected; a transmitter arranged to transmit wirelessly to the first control unit; and a multiplexer arranged to connect each of the first and second controllers in turn to the transmitter so that messages from each of the first and second controllers can be transmitted to the first control unit.

7 Claims, 5 Drawing Sheets

TWO-CHANNEL COMMUNICATION SYSTEMS

CROSS-REFERENCE TO RELATED APPLICATION

The present application claims priority to pending G.B. Patent Application Serial No. 1604136.0, filed Mar. 10, 2016, the entire disclosure of which is hereby expressly incorporated by reference.

FIELD OF THE INVENTION

The present invention relates to safety equipment and in particular to two-channel communication within safety systems. It has application, for example, in guarding systems which prevent access to dangerous machines. One application is laser guarding systems.

BACKGROUND OF THE INVENTION

Active laser guard systems are known in which stray laser beams are detected by a detection system, which responds by shutting down the laser system generating the beam. Examples of such a system are described in EP2592326A1. Such systems clearly require reliable communication between the detection system and the control system which controls the laser. It is therefore desirable to have a fully two-channel system of communication between the detection system and the control system, providing redundancy so that, when the detection of a fault is being communicated from the detection system to the control system, should one channel of communication fail, the other will still provide the necessary communication.

Two channel systems are known for wired communication between the detection system and the control system. However in some circumstances, such as when the detection system is built into a helmet and there is an increased need for full portability of the detection system, there is a need for wireless communication. Currently no wireless systems are available that can meet the highest safety standards.

SUMMARY OF THE INVENTION

The present invention provides a safety control system, for example for controlling a laser system comprising a laser device, or another piece of equipment such as a machine tool or robotic system. The safety control system may comprise a first control unit arranged to control operation of the controlled system. The safety control system may further comprise a second control unit connected to the controlled system and arranged to transmit messages wirelessly to the first control unit. The second control unit may comprise a first controller and a second controller. Each controller may be arranged to monitor the controlled system, determine whether a condition has occurred, and output messages indicative of whether or not the condition has occurred. The safety control system may further comprise a transmitter arranged to transmit wirelessly to the first control unit. The system may further comprise a multiplexer arranged to connect each of the controllers in turn to the transmitter so that messages from each of the controllers can be transmitted to the first control unit.

The safety control system may be an interlock system. For example the first control unit may be arranged to disable the controlled system if it receives a message indicating that the condition has been detected. The condition may be a fault within the controlled system, or it may be an inoperative condition of a part of the system, such as a guard, for example an open condition of a safety barrier or gate, or an open condition of a safety helmet face guard.

Each of the controllers may be arranged to perform a series of processing cycles. In each cycle it may be arranged to perform a laser detection check to determine whether the laser detector has been struck by a laser, and in each cycle it may be arranged to output at least one message relating to the results of the laser detection check.

Each of the controllers may be arranged, when it has output the at least one message, to generate an output to the multiplexer to cause the multiplexer to connect the other of the controllers to the transceiver.

Each of the controllers may be arranged to send, as part of the at least one message, a controller identifier indicating which of the controllers has generated the message. Each of the controllers may be arranged to send, as part of the at least one message, a message index, arranged to indicate the order in which the messages are output.

The multiplexer may comprise a flip-flop arranged to toggle between two states, and switching means arranged to connect the first controller to the transmitter when the flip-flop is in a first one of the states and to connect the second controller to the transmitter when the flip-flop is in a second one of the states.

Each of the controllers may be arranged to provide a respective state switch input to the flip-flop and each of the state switch inputs may be arranged to switch the flip-flop between its two states.

The system may further comprise, in any combination, any one or more features of the embodiments of the invention as will now be described below with reference to the accompanying drawings.

DESCRIPTION OF THE PREFERRED EMBODIMENTS

Figure 1:
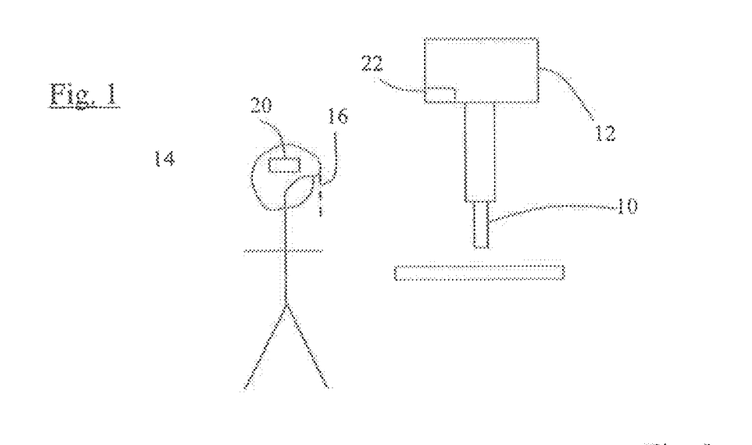
FIG. 1 is a schematic diagram of a laser safety system according to an embodiment of the invention.

Referring to FIG. 1, a laser system comprises a laser device 10, which may be a laser cutting device for example, and a control unit 12 which controls the operation of the laser unit. The laser system further comprises a safety helmet 14 which may be designed to be worn by a user of the laser system and may include a guard 16 with an inbuilt laser detection system. The laser detection system may comprise a pair of conductors 18A, 18B (show schematically in FIG. 2) built into the guard 16, and a helmet unit 20, which may be connected to the two conductors and arranged to detect, on the basis of electrical signals conducted through the conductors, when a laser strikes the guard 16. The guard may be formed of polycarbonate, and the conductors 18A, 18B may be formed of silver or another suitable conductor. An interlock unit 22 may be provided, and may form part of the laser control unit 12 and may be arranged to communicate via a wireless communication link with the helmet unit 20.

Figure 2:
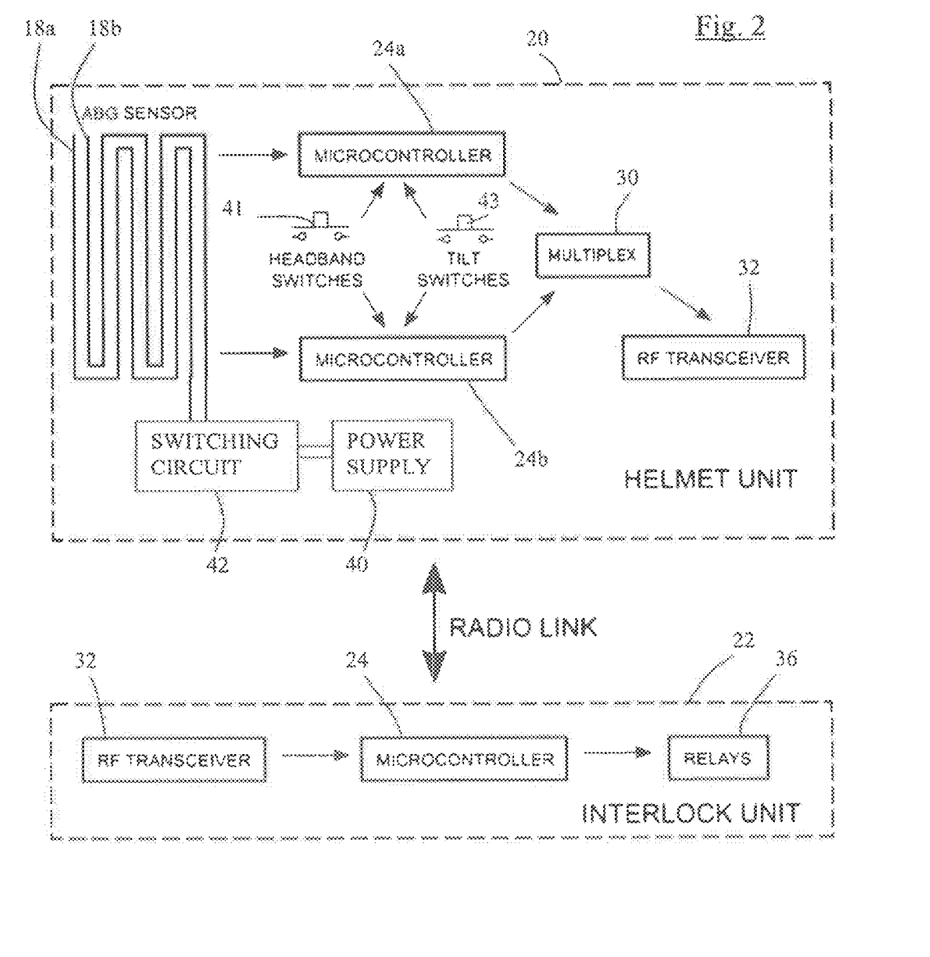
FIG. 2 is a schematic diagram of two control units of the system of FIG. 1.

Referring to FIG. 2 the helmet unit 20 may comprise two microcontrollers 24A, 24B each of which may have an input connected to one of the two conductors 18A, 18B respectively. The two microcontrollers 24A, 24B, may be programmed with different compilers derived from different ancestries. For example they may comprise a PIC18 (enhanced 8 bit) and a PIC24 (16 bit). The microcontrollers 24A, 24B and compilers may all be branded by Microchip Technology for compatibility with the MiWi protocol software, but they are preferably sufficiently different to minimise the risk of common cause failure due to errors in the software tools or silicon design. Each of the microcontrollers 24A, 24B may be arranged to determine independently whether a laser has struck the laser guard 16, which is typically due to a fault with the laser device 10, and to detect various faults in the laser guard system, and to generate messages for transmission to the interlock unit 22. The fault messages may take a number of forms and may indicate either the detection of a fault, or the absence of any fault detection.

The helmet unit 20 may further comprise a multiplexing circuit 30 which may be arranged to receive the fault messages from the microcontrollers 24A, 24B and to forward them, using time division multiplexing, to an RF transceiver 32 for transmission over a single wireless RF channel to the interlock unit 22.

The helmet unit 20 may further comprise a power supply 40 and a switching circuit 42 which is arranged to connect the conductors 18A, 18B of the guard 16 to the power supply via a number of resistors. The switching circuit 42 may be in two parts 42A, 42B each associated with a respective one of the conductors 18A, 18B, and each arranged to be controlled by a respective one of the microcontrollers 24A, 24B, which may also each be arranged to check the voltage on the respective conductors 18A, 18B at appropriate points, so as to check the integrity of the laser guard system as well as to perform laser detection.

The helmet unit 20 may further comprise one or more switches, such as headband switches 41 which are arranged to be closed when the helmet is being worn, and tilt switches 43 which are arranged to detect when the visor of the helmet is raised. There may be two headband switches 41 and two tilt switches 43 with one switch of each type connected to each of the microcontrollers 24A, 24B so that the microcontrollers 24A, 24B can detect independently of each other whether or not the helmet is an in a safe state for operation (e.g. worn and with the visor down), and output appropriate messages, such as a 'helmet worn' or 'helmet not worn' message. These switches 41, 43 therefore form interlocks which can detect when the helmet is not in a safe state, allowing the laser device to be operated only when the helmet is in a safe state.

The interlock unit 22 may comprise an RF transceiver 32 arranged to receive the fault messages over the wireless channel from the helmet unit 20 and transmit response to the helmet unit 20, a microcontroller 34 which is arranged to process the fault signals and generate any responses if appropriate, and one or more relays 36 which can be controlled by the microcontroller 34 to stop, or start, or continue, operation of the laser 10 as appropriate.

Figure 3A:
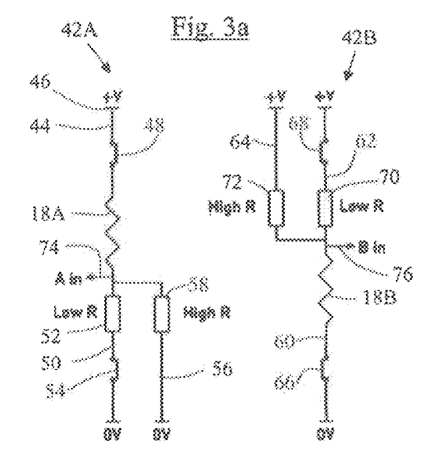
FIGS. 3a, 3b and 3c are diagrams showing operation of the laser detection system of the helmet unit of the system of FIG. 1.
Figure 3B:
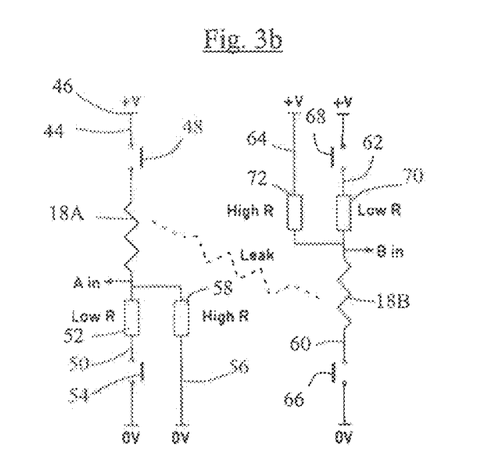
Figure 3C:
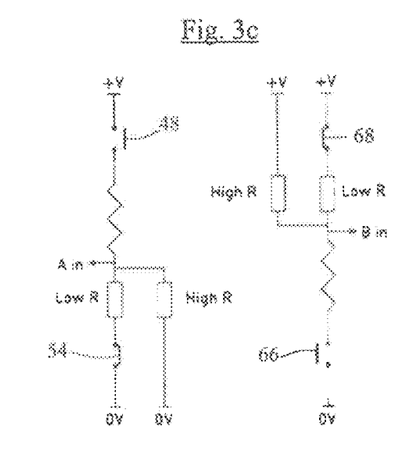

Referring to FIGS. 3a, 3b and 3c, the first part 42A of the switching circuit 42 may comprises a first connection 44 between a first end of the first conductor 18A and the positive terminal 46 of the power supply 40, which may include a switch 48 arranged to opened and closed to break or make the first connection, a second connection 50 between the other, second, end of the first conductor 18B and the negative terminal of the power supply 40, which second connection may include a low resistance 52 and a switch 54 in series. The switch 54 can be opened and closed to make or break the second connection. It may further comprise a third connection 56, also between the second end of the first conductor and the negative terminal of the power supply 40, which may include a high resistance 58. In the second part 42B of the switching circuit, equivalent connections may be provided between the second conductor 18B and the power supply terminals, except that the first connection 60 which includes a switch 66 may be to the negative terminal and the second connection 62, which includes a switch 68 and low resistance 70, and third connection 64, which includes a high resistance 72, may be to the positive terminal. The high resistance loads 58, 72 may therefore be connected permanently in series with the conductors 18A, 18B of the detector, and the low resistance loads 52, 70 may be selectively connectable in parallel with the high resistance loads 58, 72 by means of the low load switches 54, 68.

A first voltage input 74 may be connected to the second end of the first conductor 18A, between the conductor 18A and the two resistors 52, 58, and a second voltage input 76 may be connected to the first end of the second conductor 18B between the conductor 18B and the two resistors 70, 72. Each of the two voltage inputs 74, 76 may both be connected as the input to a respective one of the two microcontrollers 24A, 24B so that each of the microcontrollers 24A, 24B can monitor the voltages on one of the voltage inputs.

The first microcontroller 24A may be arranged to control the switches 48, 54 in the first part 42A of the switching circuit, and the second microcontroller 24B may be arranged to control the switches 66, 68 in the second part 42B of the switching circuit, so each of the microcontrollers 24A, 24B can independently control the state of a respective part 42A, 42B of the switching circuit.

The switching circuit may be switchable between a number of states, examples of which will be described. As each of the microcontrollers 24A, 24B is arranged control one part 42A, 42B of the switching circuit, each part of the switching circuit may be switchable into any one of the states independently of the other. However the switching may be coordinated between the two channels so that both parts of the switching circuit are in the same state for at least most of each processing cycle.

The states will therefore be described for the switching circuit 42A as a whole. A first state as shown in FIG. 3a is a continuity test state in which all of the switches 48, 54, 66, 68 are closed. This connects the two resistances 52, 58 in parallel with each other and in series with the first conductor 18A between the power supply terminals, and connects the two resistances 70, 72 in parallel with each other and in series with the second conductor 18B between the power supply terminals. The voltages at the voltage inputs 74, 76 will vary with the resistance of the conductors 18A, 18B, and so the voltages can be checked to determine that they fall within an expected range, thereby to check that there is no break in either of the conductors 18A, 18B. A variation, and in particular an increase, in the resistance of one of the conductors is indicative of damage to one of the conductors by a laser beam, i.e. an 'open-circuit' fault, which may be flagged by an appropriate message.

A second state of the switching circuit is shown in FIG. 3b. This is a leakage test state in which all of the switches 48, 54, 66, 68 are open. This connects the first conductor 18A, and the first voltage input 74 only to the negative terminal of the power supply through the high resistance 58, and the second conductor 18B and the second voltage input 76 only to the positive terminal of the power supply through the high resistance 72. Therefore current will only flow through the circuit if there is a leakage current between the two conductors 18A, 18B and the flow of such a current can be detected by a variation in the voltage inputs away from the power supply terminal voltages. The flow of such a leakage current is indicative of carbonisation of the polycarbonate or other material of the guard, i.e. a 'short-circuit' fault, which may be flagged by an appropriate message.

A third state of the switching circuit is shown in FIG. 3c and is a self-test state in which the switches 48, 66 in the first connection of each of the conductors 18A 18B is opened. This causes an open circuit preventing current from flowing through either of the conductors 18A, 18B which is equivalent to the continuity test state of FIG. 3a but with both of the conductors 18A, 18B broken. This allows each of the microcontrollers 24A, 24B to put its respective part 42A, 42B of the switching circuit into the self test state and check that a continuity fault is generated, indicating that the system is functioning.

Figure 4:
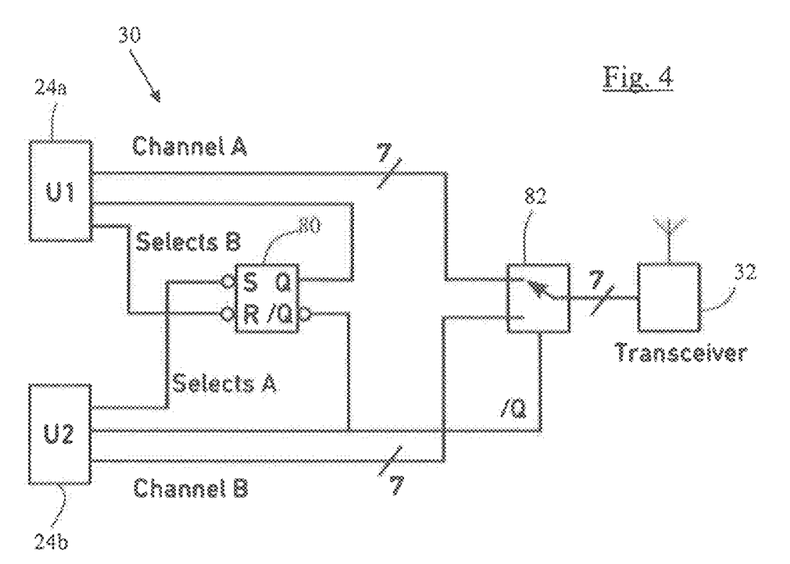
FIG. 4 is a diagram of the multiplexing circuit of the helmet unit of the system of FIG. 1.

Referring to FIG. 4, the multiplex circuit 30 connecting the microcontrollers 24A, 24B to the transceiver 32 may comprise a flip-flop 80 and a switch 82. The flip-flop 80 may be arranged to switch between states, in one of which it provides an output Q which is input to the first microcontroller 24A and in the other of which it provides an output $\overline{Q}$ which is input to the second microcontroller 24B. One of the outputs $\overline{Q}$ may also be input to the switch 82 which may respond to that input by connecting the second microcontroller to the transceiver 32. When the output $\overline{Q}$ is not received by the switch 82, the switch 82 may be arranged to connect the first microcontroller 24A to the transceiver 32. Thus the state of the flip-flop 80 may be arranged to determine which of the microcontrollers 24A, 24B is connected to the transceiver. The flip-flop 80 may also have two inputs R, S, one of which R may be connected to an output from the first microcontroller 24A and the other of which S may be connected to an output from the second microcontroller 24B. These inputs R, S allow the microcontrollers 24A, 24B to provide state-switch inputs to the flip-flop 80 to set the state of the flip-flop 80. When the flip-flop 80 produces the output $\overline{Q}$ the second microcontroller 24B may, on receipt of that input, become active. In the active state the microcontroller 24B may output messages for transmission via the transceiver 32. Since the output $\overline{Q}$ also causes the switch to connect the second microcontroller to the transceiver 32, the messages will be transmitted to the interlock unit 22. When the flip-flop 80 produces the output Q the first microcontroller 24A may, on receipt of that input, become active. Since the output Q causes the switch to connect the first microcontroller to the transceiver 32, the messages will be transmitted to the interlock unit 22. Each microcontroller 24A, 24B can therefore hand over the 'active' status to the other by switching the state of the flip-flop 80, which allows synchronisation of the two microcontrollers.

Operation of the system will now be described with reference to FIGS. 5 and 6. It will be note that, in general terms, the two microcontrollers 24A, 24B are each arranged to alternate between the active and inactive states, with only one being active at any time, the active microcontroller 24A, 24B generating messages for transmission to the interlock unit 22 while the inactive microcontroller does not. However both of the microcontrollers 24A, 24B may be able to perform safety checks in both the active and the inactive states. Also each microcontroller switches between an awake state in which it operates during processing, and a sleep state which enters between processing cycles to conserve energy. Each microcontroller 24A, 24B may be woken up either by receipt of a signal from the flip-flop, or by a timer.

Figure 5:
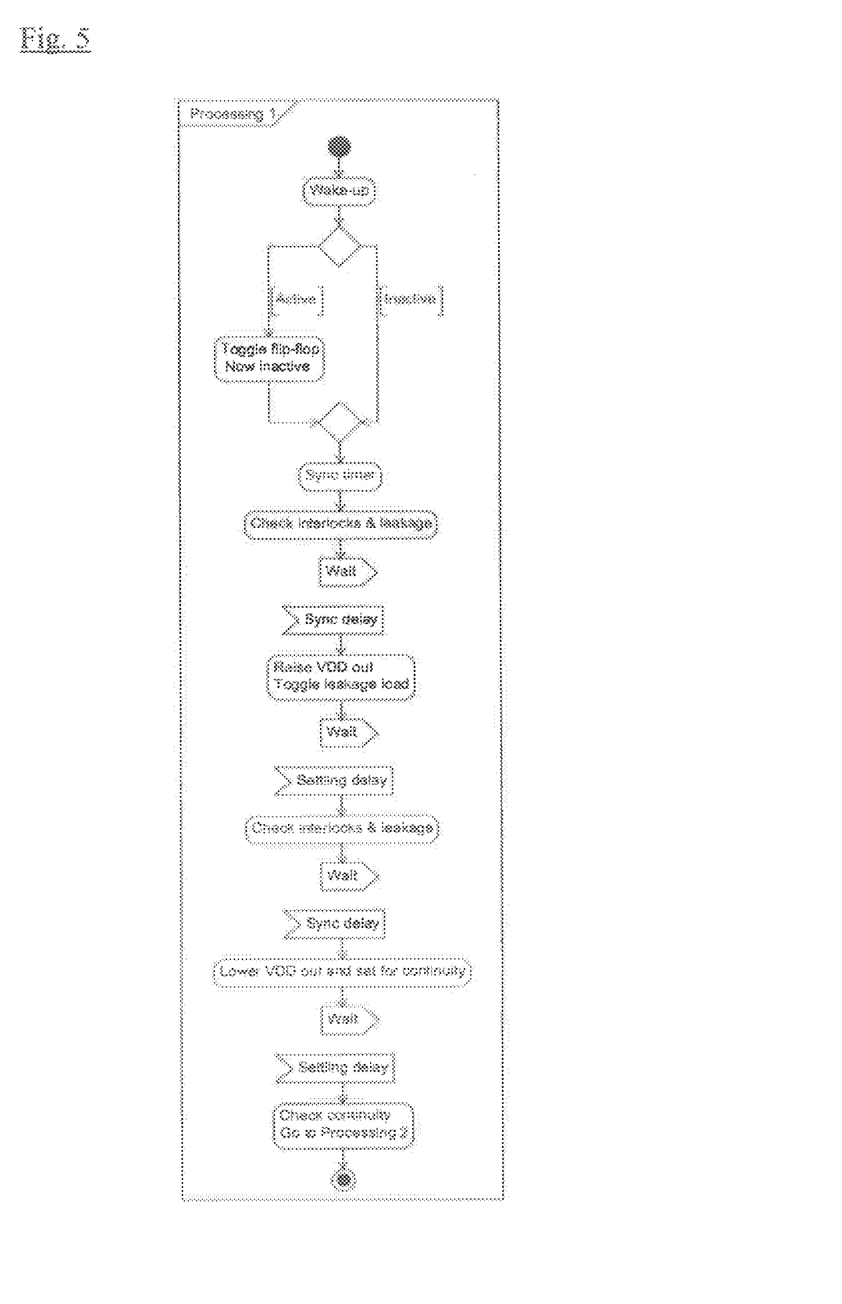
FIG. 5 is a flowchart showing part of the processing cycle of each of the two processors of the helmet unit of FIG. 1.

Referring to FIG. 5, each of the microcontrollers operates in the same way. The active microcontroller 24A, 24B is woken up by a timer, which it set on going to sleep. The inactive microcontroller is woken up by receipt of the input Q or $\overline{Q}$ from the flip-flop. On first wake-up, if the microcontroller 24A, 24B is active, it generates an output to the flip-flop 80 which toggles the state of the flip-flop and then becomes inactive. This is the hand-over step which alternates which of the microcontrollers 24A, 24B is active. Both microcontrollers 24A, 24B are then arranged to perform a series of checks. The results of these checks will determine what messages the microcontroller will transmit via the transceiver 32. However, only the active microcontroller can output messages to the transceiver 32, while the inactive microcontroller stores any fault messages it may generate until it is active and can transmit them. The checks may involve starting a synchronisation timer and switching the switching circuit to the leakage detection state, checking the voltage inputs 74, 76 to test for leakage. It may also involve checking the interlocks 41, 43 to determine that the helmet is worn or not, or otherwise in a safe state for operation or not. After a synchronisation delay the switches 48, 66 may be alternated open/closed and the voltage inputs monitored to check that the low resistance load 52, 70 or its switch 54, 68 is not shorted. Then after a further delay, the interlocks and leakage may be checked again, then after a further delay the switches 48, 66 closed to test for continuity. Then after a further delay, continuity may again be checked. It will be appreciated that the number, and order, of individual tests in each cycle can be varied as required.

Figure 6:
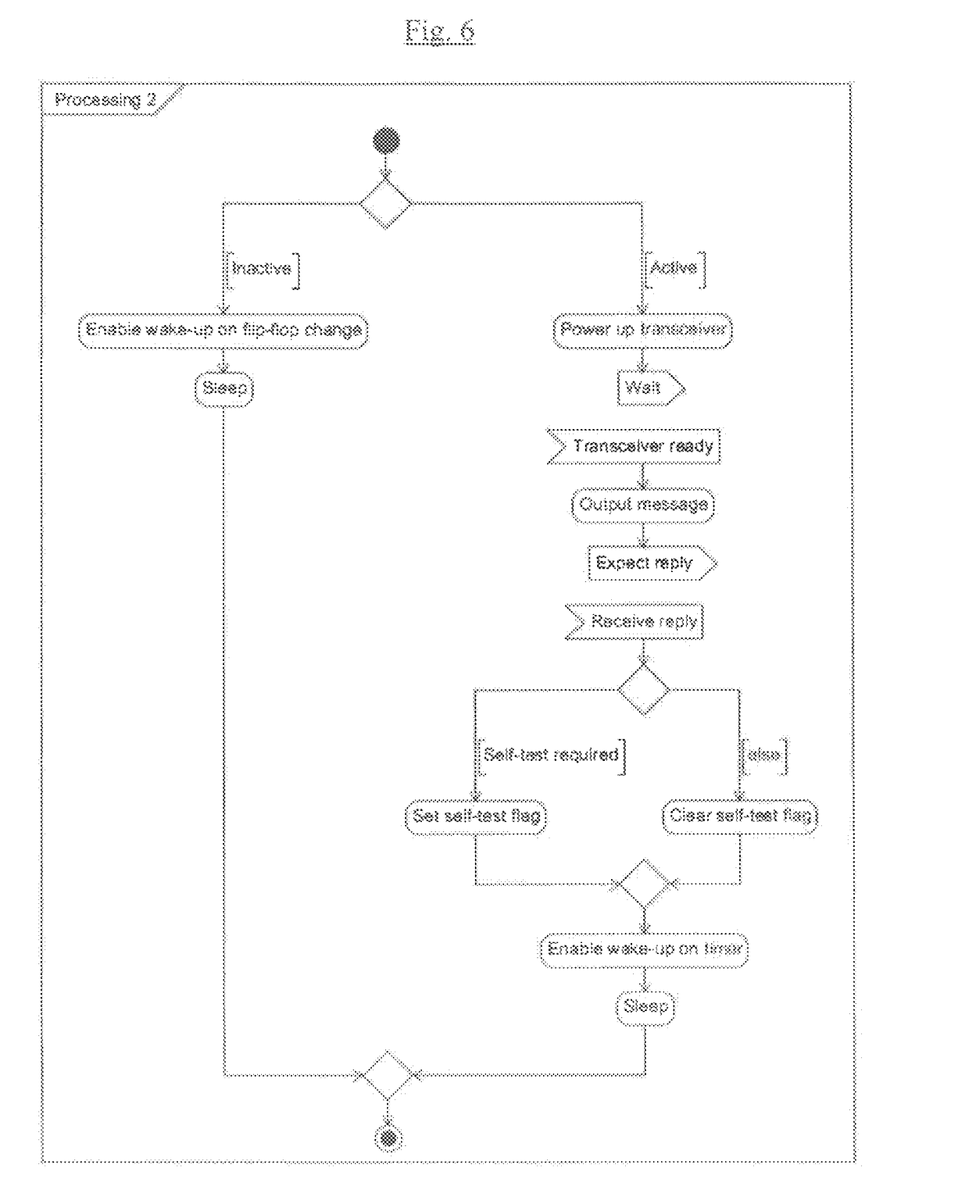
FIG. 6 is a flowchart showing a further part of the processing cycle of each of the two processors of the helmet unit of FIG. 1.

Referring to FIG. 6, once the various checks have been performed, the results are then communicated to the transceiver 32 by the active microcontroller 24A, 24B. The inactive microcontroller 24A, 24B may set itself to wake up on receipt of the input Q or $\overline{Q}$ from the flip-flop, and then go to sleep. The active microcontroller 24A, 24B may power up the transceiver 32 and then wait for the transceiver 32 to respond. On receipt of confirmation from the transceiver that it is ready, the microcontroller 24A, 24B may output to the transceiver any messages for transmission and await a reply. The reply may include an indication that self-test is required. If it does, then the microcontroller 24A, 24B may be arranged to set a self-test flag, if it does not, then the self-test flag is cleared. Then the microcontroller 24A, 24B is arranged to set a timer, which will cause it to wake up, and then to go to sleep. Processing then returns to the beginning of the cycle of FIG. 5.

The results that are transmitted in each cycle may not be based just on the checks performed in that cycle. For example each of the microcontrollers 24A, 24B may be arranged to transmit a fault message, or generate a fault message for transmission, only after detecting the same fault in a number of consecutive cycles, for example three consecutive cycles.

If the self-test flag is set, then for the next processing cycle, the microcontrollers 24A, 24B are arranged to switch the two parts 42A, 42B of the switching circuit to the self-test state by opening the switches 48, 66 and then to perform the normal sequence of checks, including the check for an open-circuit fault. If an open-circuit fault is detected then the self-test is successful, but if not it is unsuccessful. The successful self-test may be checked by the interlock unit 22, which may be arranged to request the self-test by sending a request message to the helmet unit 20, and then check for receipt of an open-circuit fault from the helmet unit 20.

The messages transmitted between the helmet unit 20 and the interlock unit 22 need to be arranged so as to minimize the chances of an error. The communications protocol may be Microchip's MiWi, based on IEEE 802.15.4, for example using the global 2.4 GHz unlicensed band. Although limited to Microchip devices, this is low-cost and requires minimal memory resources to implement. Other protocols may of course be used.

If an alarm message were registered as an 'OK' message, this would constitute a dangerous failure. The requirements listed in applicable standards are as follows:

| ISO 13489-1, 4.2.2 PL = e | Probability of dangerous failure per hour <10e−7 |
|---|---|
| IEC 62745 draft | Probability of undetected error in frame <10e−8 |
| IEC 62745 draft | Hamming distance of at least 4 (i.e. messages must differ in at least 4 bits from any other member of the set of valid messages) |

It is difficult to quantify the probability of generating an incorrect message, due to the variability of radio communication and the presence of software in the path. However it has to be assumed that incorrect messages will be produced, and the system then needs to be arranged to minimise the probability of their misinterpretation as valid messages. Misinterpretation is presumed to be dangerous.

The maximum rate possible for the system will be about 1 message per 10 ms, or 360000 messages per hour, so it can be seen that the ISO 13489-1 requirement is the most stringent, requiring a probability of dangerous failure due to undetected error of $(10^{-7}/360000)=2.8\times10^{-13}$.

The IEEE 802.15.4 protocol incorporates a 16-bit cyclic redundancy check (CRC-CCITT, polynomial $2^{\wedge}16+2^{\wedge}12+2^{\wedge}5+1$). A 16-bit CRC operating ideally should reduce undetected errors by a factor of $2^{\wedge}16$ (65536). Real-world operation is typically non-ideal, so a reduction in undetected errors of $10^4$ is a reasonable 'worst case' assumption. This leaves a factor of $2.8\times10^9$ to be achieved by the message payload.

The use of a small number of codes in a large numeric set can reduce the probability of an invalid message being interpreted as valid. The required set of messages is quite small, and may be no more than six, for example:

| Helmet to interlock | OK - helmet not worn |
| | OK - helmet worn |
| | Alarm open-circuit |
| | Alarm short-circuit |
| Interlock to helmet | Acknowledge normal |
| | Acknowledge and test |

32-bit hex codes for the messages are shown below. This represents 6 numbers in a set of $2^{\wedge}32=4.29\times10^9$. The ratio of invalid to valid messages is therefore $7.15\times10^8$ and only one of the helmet messages indicates an OK condition with no helmet interlock. The codes are designed to avoid confusion by inversion and bit-shifting, and to space the differing bits across the word to reduce the probability of confusion due to burst errors.

| Message | No | Code |
|---|---|---|
| OK - helmet not worn | 1 | 5C3A5C3A |
| OK - helmet worn | 2 | 4D2B4D2B |
| Alarm open-circuit | 3 | A1E5A1E5 |
| Alarm short-circuit | 4 | B0F4B0F4 |
| Acknowledge normal | 5 | 3E1C3E1C |
| Acknowledge and test | 6 | 2F0D2F0D |

A table of Hamming distances for the possible message pairs is shown below. The most important pairs, shown in bold, are those which could create confusion between alarm and 'OK' messages. These are not less than twice the required Hamming distance.

| Message No. | 1 | 2 | 3 | 4 | 5 |
|---|---|---|---|---|---|
| 1 | | | | | |
| 2 | 8 | | | | |
| 3 | 28 | 20 | | | |
| 4 | 20 | 28 | 8 | | |
| 5 | 12 | 20 | 24 | 16 | |
| 6 | 20 | 12 | 16 | 24 | 8 |

With a high degree of message corruption the system would be unusable, so a level of 10% corruption is used for estimation.

| Initial message corruption rate | 0.1 |
|---|---|
| Reduction of undetected error due to CRC | 10e−4 |
| Fraction of codes indicating OK condition | 2.33 × 10e−10 (1 in 4 × 10e+9) |
| Fraction of messages with dangerous failure | 2.33 × 10e−15 |
| Number of messages in 1 hour | 360000 |
| Dangerous failures per hour | 8.39 × 10e−10 |

Clearly the number of possible messages and the meaning of each message can be varied from those described above. Typically there must be at least two possible messages from the helmet unit 20 to the interlock unit 22: one indicating a fault and one indicating no fault. The number of different fault messages can be selected depending on the detection system and the number of different faults it can identify. Similarly the number of messages from the interlock unit 22 to the helmet unit may be greater, for example if the interlock unit is arranged to determine in more detail which test are to be performed in each processing cycle.

Each microcontroller 24A, 24B may be arranged to send, as part of each message, a channel identifier which identifies which of the two microcontrollers 24A, 24B is transmitting the message, i.e. which of the two channels is active. It may also be arranged to send, as part of each message, a message or cycle index which changes with each message sent. The use of sequence and channel numbers means that successive messages are guaranteed to be different, even if they contain the same status information, and because of the action of the CRC generation, the transmitted CRC code will differ significantly. They also allow the interlock unit 22 to check that each message received is from the expected microcontroller, for example the other microcontroller 24A, 24B from the previous message, and carries the expected message index, for example the next index in a predetermined sequence, so that if any messages are not received, this can be detected by the interlock unit 22. The channel identifier may be in the form of a mask, for example a byte of data, that is combined with each byte of the status message, for example using an exclusive-OR (EX-OR) gate. An example of the channel identifiers for channels A and B is 00 and AA in hexadecimal, which are 00000000 and 10101010 in binary. Other masks such as AA and 55 may also be used. The channel mask is applied to the status code so that even if the codes have the same significance, the actual message will be different for each channel.

While the embodiments shown in the drawings relate to laser safety systems, in other embodiments the equipment that is being controlled may be, for example, a machine tool or a robotic system and the fault detection may comprise detection of aspects of the physical operation of the system, or diagnostic detection of electrical or processing faults in the system.

A further specific embodiment comprises a robot, or an automated guillotine or other machinery, located within a safety cage with an access gate. The access gate has interlock switches, with one control unit arranged to monitor the switches, and a second control unit is arranged to stop the robot when the gate is opened, as detected by the switches. Hard wired systems are normally used but wireless communication between the control units as described above is advantageous in various circumstances, for example when cable routing is difficult or costly.

A further example of systems where the present invention is useful is in machine installations which are temporary, where safety interlocks are needed, and a wireless system as described above is much quicker and easier to install than a hard wired system.

A still further application of the present invention is in the operation of cranes or powered access equipment where limits of movement of the equipment are set by optical sensors, or other types of sensor or detector. In this case the optical sensor operates in similar fashion to a gate interlock switches described above, and one control unit monitors the switches and gives a dual channel signal to the other control unit to stop the crane when the limits of movement are reached. Transmission of the signal to the crane control unit by cable is not very practical and a wireless communication system is advantageous.

It will be appreciated that many of the details described above can be modified depending on the type of detection system and the level of integrity that is required.

The invention claimed is:

1. A safety control system comprising:
a first control unit arranged to control a controlled system,
a second control unit arranged to detect a fault with the controlled system and arranged to transmit messages wirelessly to the first control unit,
wherein the second control unit comprises:
a first controller arranged to detect a condition of the controlled system and output messages indicative of whether or not the condition has been detected;
a transmitter arranged to transmit wirelessly to the first control unit;
a second controller also arranged to detect said condition of the controlled system and output messages indicative of whether or not said condition has been detected; and
a multiplexer arranged to connect each of the first and second controllers in turn to the transmitter so that messages from each of the first and second controllers can be transmitted to the first control unit;
wherein each of the first and second controllers is arranged to perform a series of processing cycles, and in each of the processing cycles to: perform a check to determine whether the condition has occurred in the controlled system; and then to output at least one message relating to the results of the check; and
each of the first and second controllers is arranged, when it has output the at least one message, to generate an output to the multiplexer, the output being arranged to cause the multiplexer to connect the other of the first and second controllers to the transmitter.

2. A safety control system according to claim 1 wherein each of the first and second controllers is arranged to send, as part of the at least one message, a controller identifier indicating which of the first and second controllers has generated the message.

3. A safety control system according to claim 1 wherein each of the first and second controllers is arranged to send, as part of the at least one message, a message index, arranged to indicate the order in which the messages are output.

4. A safety control system according to claim 1 wherein the multiplexer comprises a flip-flop having first and second states and arranged to toggle between the first and second states, and at least one switch, wherein the at least one switch is arranged to connect the first controller to the transmitter when the flip-flop is in said first state, and to connect the second controller to the transmitter when the flip-flop is in said second state.

5. A safety control system according to claim 4 wherein each of the first and second controllers is arranged to provide a respective state switch input to the flip-flop and each of the state switch inputs is arranged to switch the flip-flop between said two states.

6. A safety control system according to claim 1 which is arranged to perform an interlock function whereby the first control unit is arranged to disable the controlled system if it receives a message from the second control unit indicating that the condition has been detected.

7. A safety control system according to claim 1 wherein the controlled system is a laser system, the safety control system further comprises a laser detector, and the check is arranged to determine whether the laser detector has been struck by a laser.

* * * * *